United States Patent Office 3,630,887
Patented Dec. 28, 1971

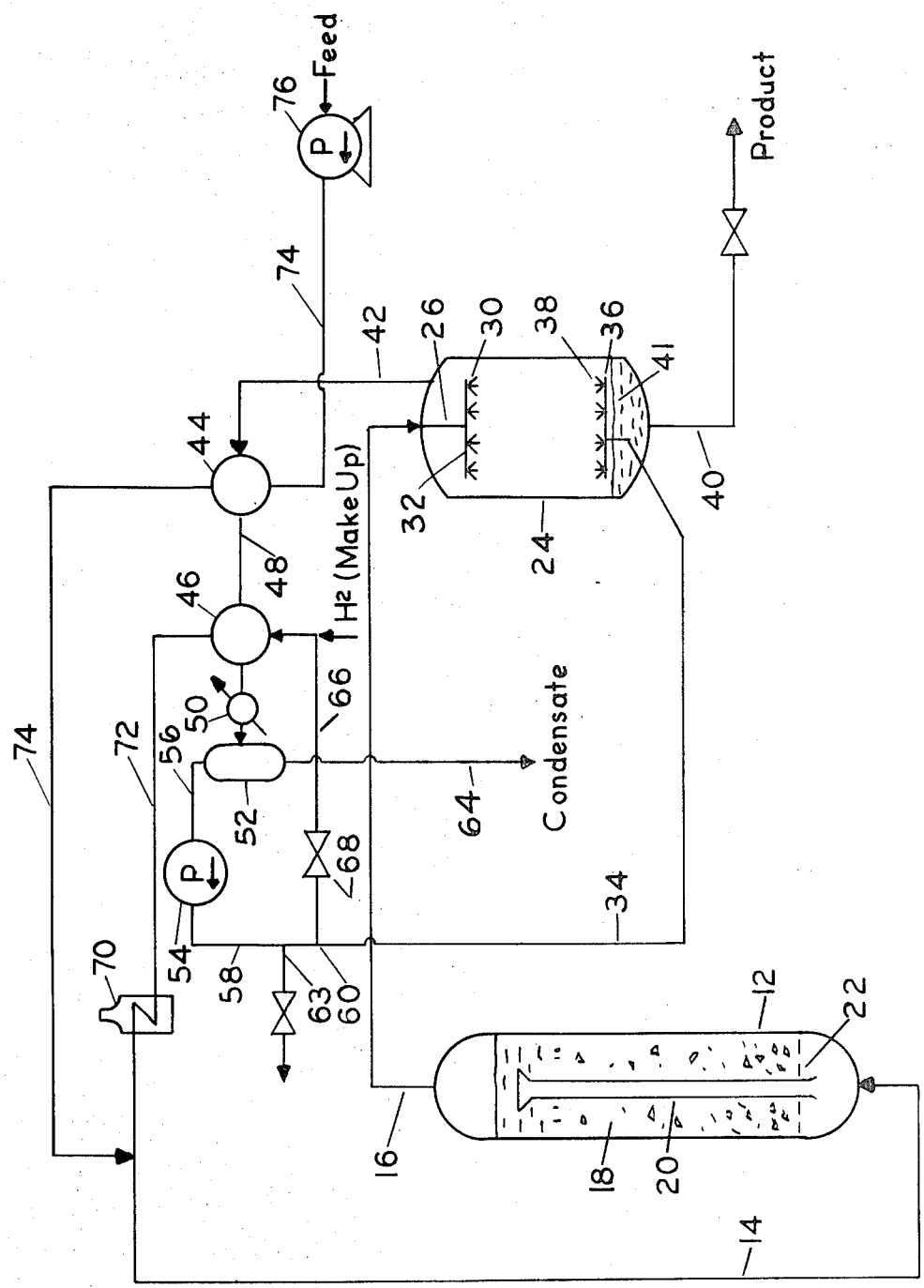

3,630,887
RESIDUAL OIL HYDROGEN TREATING PROCESS
William R. Mounce, Cranbury and Roger P. Van Driesen,
Hopewell, N.J., assignors to Cities Service Research and
Development Company, New York, N.Y.
Filed Feb. 5, 1970, Ser. No. 8,857
Int. Cl. C10g 13/02
U.S. Cl. 208—100                          3 Claims

ABSTRACT OF THE DISCLOSURE

An improved hydrogen treating process is disclosed in which a residual oil feed is treated with hydrogen in the presence of an ebullated catalyst bed at temperatures in a reactor between 800° F. and 900° F. and pressures between 2000 and 3000 p.s.i. The reactor effluent stream is cooled by spraying it down through an upwardly rising stream of cool recirculating hydrogen-rich gas resulting in transfer of heat to the gas and recovery of hydrogen from the effluent. The recirculating gas and recovered hydrogen is cooled by the incoming oil feed and additionally cooled before being pressurized to reactor pressure, and an aliquot portion of the cooled pressurized gas recirculated as coolant for the effluent, the remainder being recycled to the reactor with the feed.

BACKGROUND OF THE INVENTION

This invention relates to an improvement in the process of treating heavy hydrocarbon residual oil with hydrogen in the presence of particulate catalyst. More particularly this invention relates to the effective recovery of heat and dissolved hydrogen from a high temperature and high pressure reactor liquid stream which also contains hydrocarbon components tending to foul surface type heat exchangers.

Heavy hydrocarbon residual oils, such as vacuum and atmospheric residuum from crude petroleum oil and synthetic crude oil such as is extracted from tar sands, are presently the subject of many processes for treatment to obtain lower boiling oils as well as achieving desulfurization and denitrogenation. Such heavy oils generally have an initial boiling point of above 1650° F., low gravity e.g. under 20° API at 60° F. and contain relatively large quantities of asphaltic material, sulfur, nitrogen and organo-metallic complexes of high molecular weight.

An effective process for processing such heavy hydrocarbon feeds includes contacting the oil in the liquid phase with a hydrogen containing gas in the presence of a particulate catalyst bed. The heavy oil is passed upwardly through the bed at sufficient velocity to expand the bed and induce random motion among the catalyst particles. Such a catalyst bed is known as an ebullated bed. The hydrotreating is conducted at relatively high temperatures and pressures, a temperature of from 800° F. to 900° F. and a pressure of from 2000 p.s.i. to 3000 p.s.i.g. being preferred. An illustrative patent is U.S. Patent No. Re. 25,770 issued Apr. 27, 1965 to E. S. Johanson for Gas-Liquid Contacting Process, and the method is embodied in a commercially parcticed refining process known as the "H-Oil" process As significant quantities of hydrogen are required ranging from 1000 to 50,000 cubic feet of hydrogen per barrel of feed, it is also necessary to incorporate an effective means for recovering hydrogen from the reactor product. Also significant amounts of heat are required to bring the hydrocarbon oil feed, and the hydrogen containing gas up to an adequate temperature to allow the hydrotreating process which is exothermic in nature to sustain itself. Accordingly prior practice has been to remove the effluent from the reactor, cool the effluent in a surface type heat exchanger (possibly recovering heat in this manner), and then subject the cooled effluent to conventional gas-liquid separation thereby recovering hydrogen in the separated gas stream. The cooled and separated liquid stream is then possibly flashed at a reduced pressure, for example 1500 p.s.i., to recover hydrogen dissolved in the liquid. In certain of these hydrotreating operations in which the resulting liquid effluent contains relatively excessive amounts of residual materials such as asphaltic material, conventional cooling in a surface contact heat exchanger, such as a shell and tube heat exchanger, is not practical since the material tends to foul the exchanger tubes and heat transfer surfaces. It is therefore quite desirable to utilize the process in which hydrogen and heat content recovery from the reactor effluent is achieved without fouling of heat exchangers or equipment.

SUMMARY OF THE INVENTION

Accordingly we have invented an improvement in the process of catalytically treating heavy hydrocarbon residual oils with hydrogen at high pressures and temperatures in the liquid phase. The process comprises contacting the heavy hydrocarbon residual oil feed with hydrogen in the presence of an expanded bed of particulate catalyst in a high pressure, high temperature reaction zone, withdrawing treated effluent from the reaction zone, separating the effluent into vapor and liquid streams, cooling the vapor stream and recycling the vapor stream as a source of hydrogen back with the feed. The improvement comprises diverting an aliquot portion of the cooled vapor stream as a cooled recirculating gas stream, and contacting the withdrawn effluent stream with the cool recirculating gas stream so as to cool the liquid phase of the effluent to a temperature of from 200 to 500° F. and preferably 200° to 400° F., entrap hydrogen coming out of solution in the vapor and transfer heat from the effluent to the vapor stream now containing recovered hydrogen. The cooled liquid phase product stream is separated from the vapor stream and withdrawn for further processing. The separated vapor is cooled, and an aliquot portion of the cooled vapor is recycled to the reaction zone as a source of hydrogen, the remaining portion of the cooled vapor stream being used as the source of cool fluid for contacting the effluent stream. Preferably the step of contacting the treated effluent with the cooling fluid comprises spraying the effluent downwardly through an upward stream of the cooling fluid.

It is therefore an object of this invention to provide an improved process for the hydrogen processing of heavy hydrocarbon oils.

Another object of this invention is to provide an improvement in the above process resulting in effective recovery of process hydrogen and heat.

Other objects and advantages of the improved process of this invention will be apparent to those skilled in the art from the brief description of the drawing and preferred embodiments which follow.

BRIEF DESCRIPTION OF THE DRAWING

The drawing is a schematic view of the process of this invention showing the principal streams and process apparatus.

DESCRIPTION OF THE PREFERRED EMBODIMENTS

Referring now to the drawing, a high pressure, high temperature reactor vessel 12 is shown having a feed conduit 14 leading into the bottom of the vessel and an effluent conduit 16 exiting from the top of the vessel. The vessel is a suitable cylindrical high pressure vessel enclosing an expanded catalyst bed 18 referred to as an ebullated bed, and internally mounted recycle conduit 20 and a one way grid 22 in the lower portion of the vessel, above which the expanded catalyst bed is established. Temperatures in the reactor vessel are maintained at a minimum of 700° F. with a temperature in the range of 800 to 900° F. being preferred. Pressure is maintained in the range of from 1500 p.s.i.g. to 4000 p.s.i.g. with a range of between 2000 and 3000 p.s.i.g. being preferred. The feed and hydrogen gas is caused to flow upwardly in the reactor at sufficient velocity to expand the catalyst bed up to five times its quiescent volume and to induce random motion among the particulate catalyst. For this purpose internal recycle utilizing the recycle conduit 20 is employed and a suitable space velocity is established in the reactor vessel. Space velocity may vary widely for purposes of establishing ebullated catalyst bed, the range for example, may be from 0.2 to 3.0 volumes of reactant per hour, per volume of reactor vessel capacity.

A hydrogen containing gas from a source which will be hereinafter described is introduced into the bottom of the vessel along with the feed. The quantity of hydrogen is on the order of from 2000 standard cubic feet of hydrogen per barrel of fresh feed (s.c.f./b.) to 10,000 s.c.f./b., and more preferably from 3000 to 7000 s.c.f./b. Feed and hydrogen containing gas is introduced at elevated temperatures of from 650° F. to 750° F., these temperatures being achieved with an economical input of energy and heat from outside heat sources such as a fired heater.

Feed is any heavy hydrocarbon oil having an initial boiling point (IBP) above 650° F. and more preferably 975° F. and containing significant quantities of high boiling asphaltic materials. Examples of suitable feeds include vacuum and atmospheric residuum from crude petroleum oil, and crude oil extracted from tar sands. They generally exhibit an initial boiling point of above 650° F., an API gravity of less than 20° at 60° F., contain at least 20% material boiling above 975° F. and besides containing asphaltic material may also contain undesirable quantities of sulfur, nitrogen and organo-metallic complexes of high molecular weight.

Effluent withdrawn from the reactor vessel comprises a liquid and vapor mixture at reactor pressure and temperature and contains besides the hydrocarbon constituents, hydrogen, hydrogen sulfide and ammonia. The effluent is passed via the effluent withdrawal conduit to a counterflow direct contact heat exchanger 24 which additionally functions as a vapor-liquid separator. The counterflow direct contact heat exchanger functions at system pressure, with direct contact of the hot and cool fluids. In this case the cooling fluid stream is an upflowing recirculating gas stream which contacts the downflowing hot effluent stream in order to cool the effluent, cool the liquid phase effluent to a temperature of from 200° F. to 400° F., remove dissolved hydrogen from the effluent, transfer heat from the reactor effluent stream to the vapor stream for further use. The direct contact heat exchanger 24 for this purpose is essentially a high pressure vessel having a hot liquid spray apparatus 26 mounted in the upper part of the vessel. Spray apparatus 26 is connected to the effluent withdrawal conduit 16 and has a number of spray heads 30 supported on a distributing pipe 32, through which the effluent is sprayed downwardly into the exchanger. The cooling fluid, a recirculating gas stream, is fed into the exchanger through a pipe 34 to a distributing ring 36 horizontally mounted in the lower portion of the exchanger 24 and having a multiplicity of upwardly facing outlets 38. Cooled liquid is removed from the exchanger through a liquid drain pipe 40 opening into the bottom of the exchanger at a point below which a liquid 41 is maintained. Heated vapor is removed from the exchanger via a vapor conduit 42 opening into the top of the exchanger. Various advantages result from use of a direct contact type heat exchanger of the type described for the process of this invention. Heat transfer does not take place by conduction between surfaces in contact with the fluids but by direct contact between the fluids. Also since the fluids are separated by phase, components of one fluid which change phase during the heat transfer are transferred to the other stream, thus allowing for simultaneous liquid-vapor separation during heat transfer. Because there is no requirement for heat transfer through conducting walls such as in shell and tube heat exchangers, no problems arise from the presence of materials which tend to coat and clog the heat transfer surfaces and pipes. This is important because the heavy hydrocarbon oils which are the preferred feeds for the aforementioned hydrogen processing contain such materials generally delineated as high boiling asphaltic materials. These are generally regarded as colloids of "asphaltenes" and "resins" in oil both of which are solids or semi-solid materials, each clearly with a propensity to unsatisfactorily effect surface type heat transfer apparatus. This may be one explanation of the cause of fouling actually encountered in prior art processes, although other factors may also be of account.

Another advantage of using a contact type heat transfer is that in the hydrogen processing operation of the present process, large quantities of hydrogen are dissolved in the liquid phase of the effluent. It is necessary at constant pressure to significantly reduce the temperature of the effluent to release the dissolved hydrogen. This is effectively achieved by intimately contacting the liquid effluent with a cooling fluid stream, in the present case a recirculating gas stream containing process hydrogen. System pressure, allowing for pressure drop, is maintained in the direct contact heat exchanger to preclude having to recompress the vapor stream at a high pressure differential. Temperatures of the liquid phase product is as low as 200° F. based upon viscosity limitations.

The cooled liquid product from the direct contact heat exchanger vessel is withdrawn through drain 40 for further treatment, not shown or more preferably to product storage. The vapor stream from the direct contact heat exchanger is passed to a conventional surface type heat exchanger 44 serving as a feed oil heater where heat is transferred to the heavy hydrocarbon feed oil. The vapor stream from the feed oil heater is then passed to an intermediate heat exchanger 46 via pipe 48. At the intermediate heat exchanger 46, heat from the vapor stream is transferred to the gas stream to the reactor vessel (as will be hereinafter described). The vapor stream from the intermediate heat exchanger 46 is then cooled further in cooler 50 using water as the cooling fluid to condense additional hydrocarbon and is fed to a high pressure vapor-liquid separator 52. Separator 52 operates at system pressure, again allowing for line pressure drop, and at a reduced temperature of from 50° F. to 150° F., with a temperature range from 80° F. to 120° F. being preferred. The separated gas stream from separator 52 is compressed to reactor system pressure and divided into two streams, a recirculating gas stream and a recycle gas stream to the reactor. To accomplish this the gas stream passes from the separator 52 to a compressor 54 via pipe 56. Since the inlet pressure of the gas stream to the compressor is effectively reactor pressure less than the pressure drop in the various heat exchangers and piping, the pressure differential at which the compressor 54 operates is relatively low, being on the order of no more than two hundred p.s.i. The compressed gas stream from compressor 54 is carried via compressor outlet pipe 58 to a T-pipe connection 60 where the gas stream is separated into the recirculating gas stream and into the recycle gas stream to the reactor.

The recirculating gas stream is piped via pipe 34 to the direct contact heat exchanger 26 for use as the cooling fluid. The rate of flow is controlled by the speed of the compressor, a flow recorder, not shown, being placed in pipe 34. Hydrogen purity is maintained by purging a sufficient quantity of the gas stream through line 63. The condensed liquid stream is withdrawn, from the separator 52 through pipe 64 and is subject to further treatment or storage, not shown.

The recycle gas stream to the reactor is passed through pipe 66 to the intermediate heat exchanger 46 as the coolant where it picks up heat from the vapor stream. A valve 68 mounted in line 66 regulates the flow rate of the recycle gas stream to the reactor. After passing through the intermediate heat exchanger 46 the recycle gas stream is heated in a fired heater 70 where it is brought up to that temperature necessary to allow the reactor to sustain reactor operating temperature. The temperature range preferred for the gas supply stream to the reactor is from about 700° F. to about 1000° F. As a result of using the recycle gas stream to partially cool the vapor stream to the separator 52, less heat input is necessary at the fired heater 70. The fired heater is mounted in gas supply line 72 which connects to feed conduit 14.

Also connecting to the feed conduit 14 is a feed oil conduit 74 which is connected at its upstream side to the feed oil heater 44. Feed oil is supplied to the feed oil heater through feed pipe 74 which is connected to a feed oil pump 76. The feed oil is supplied to the process of this invention at system pressure by the feed oil pump from a source not shown.

In operation feed oil is therefore initially brought to system pressure, heated in the feed oil heater 44 by heat transfer from a heated vapor stream, and then mixed with the heated hydrogen gas supply prior to being fed to the reactor vessel 12. Effluent from the reactor vessel at system pressure and temperature is initially directly contacted with the cooled recirculated gas stream. As a result the effluent stream is subjected to consequent cooling, removal of dissolved gases from the effluent, and vapor-liquid separation, with heat being transferred to the vapor stream. The vapor stream is then used to heat the feed oil initially, and to transfer heat to the recycle gas stream to the reactor, prior to being further cooled and separated into the gas stream and a condensed liquid stream. A portion of the resulting separated gas stream is recirculated to the direct contact heat exchanger as cooling fluid. Not only are there no problems in fouling as would occur in a surface contact heat exchanger, but hydrogen and latent heat is effectively recovered from the effluent stream.

With a view to further illustrating the process according to the present invention but not as a limitation thereon, the following example is given. 20,000 barrels per stream day (BPSD) of a vacuum residuum having an initial boiling point of 975° F., a gravity of 10° API at 60° F., is introduced into the feed stream at a pressure of about 3000 p.s.i.g. and initially heated to 675° F. by feed oil heater 44, specifically a shell and tube heat exchanger. The recycle stream to the reactor vessel comprising about 6,000 c.f./b. of hydrogen at 75% vol. of the stream is heated to 900° F. from 500° F. by the fired heater 70. The reactor vessel is maintained at a pressure of 3000 p.s.i.g., and a temperature of about 840° F., and results in an effluent temperature of 840° F. at system pressure. The total effluent is transferred to the direct contact heat exchanger and contacted with 170 million (mm) s.c.f./d. of the recirculated gas stream at a temperature of about 100° F. The resulting liquid product comprising about 14,000 b.p.s.d. of liquid hydrocarbon is at a temperature of 250° F., and is characterized by 20° API, and an initial boiling point of 300° F. The vapor stream withdrawn from the direct contact heat exchanger 26 is at a temperature of 750° F. Operating pressure in the direct contact heat exchanger is about 2950 p.s.i.g. The vapor stream at 750° F. is passed to the feed oil heater, a surface type heat exchanger of the shell and tube type, where heat is initially transferred from the vapor stream to the feed oil stream raising the feed oil to a temperature of 675° F. and cooling the vapor stream to 565° F. The vapor stream is cooled by heat transfer in the intermediate heat exchanger to 415° F. transferring heat to the recycle gas stream. The vapor stream is then subsequently cooled in cooler 50 to 100° F. and then separated into gas and condensed liquid streams. The gas stream is compressed to system pressure of about 3050 p.s.i.g. and an aliquot portion thereof used as the recirculating gas stream to the direct contact heat exchanger 26, the remainder being used as the recycle gas stream to the reactor. The recycle gas stream comprises about 75% by volume hydrogen, and is first heated by heat transfer in the intermediate heat exchanger 46 and then in the fired heater 70 to 900° F.

Having fully described our invention and wishing to cover those modifications and variations which would be readily apparent to those skilled in the art,

We claim:

1. In a process for the catalytic treatment of heavy hydrocarbon residual oil feed with hydrogen comprising contacting said residual oil with hydrogen in the presence of particulate catalyst at a high temperature above 700° F. and a high pressure between 1500 p.s.i. and 4000 p.s.i., to obtain an effluent stream containing dissolved hydrogen and vapor, separating said effluent stream into vapor and liquid streams, cooling the vapor stream and recycling said vapor stream as a source of hydrogen back with the residual oil feed, the improvement which comprises:

diverting an aliquot portion of said cooled vapor stream as a cooled recirculating gas stream, and directly contacting said effluent stream with said cooled recirculating gas stream by passing said cooled recirculating gas upwardly through a downwardly directed spray of said effluent stream, said cooled gas acting to cool said contacted effluent stream to a temperature between about 200° F. and 500° F. and to separate said effluent stream into said vapor and liquid streams.

2. The process of claim 1 wherein said step of cooling said vapor stream comprises initially heating said heavy hydrocarbon residual oil feed by heat transfer from said separated vapor stream.

3. The process of claim 2 which additionally comprises additionally coiling said vapor stream after heating said feed with said separated vapor stream, and separating condensed liquid from said additionally cooled vapor stream.

References Cited

UNITED STATES PATENTS 3,471,397  10/1969  Fortman _____ 208—100

HERBERT LEVINE, Primary Examiner

U.S. Cl. X.R.

208—48 Q, 108, 157